April 27, 1965  L. N. HAVENER  3,180,597
CLIP TYPE FASTENER
Filed Oct. 15, 1962
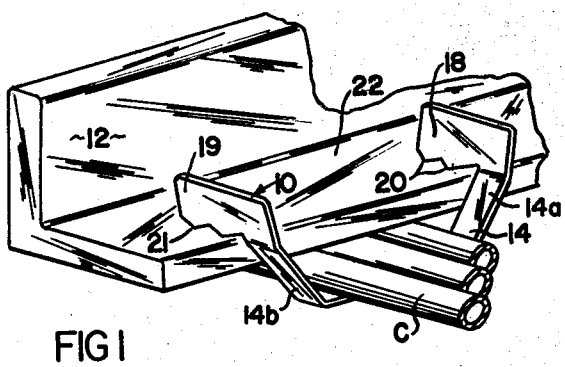
FIG 1
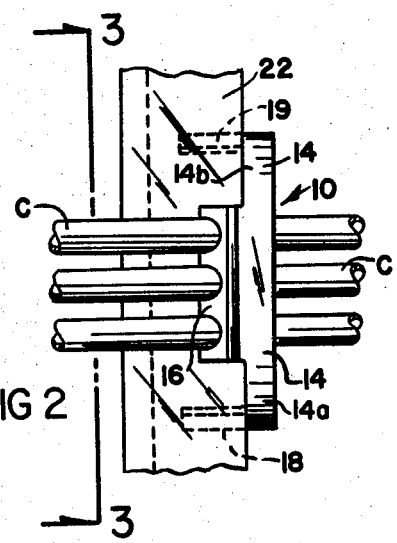
FIG 2
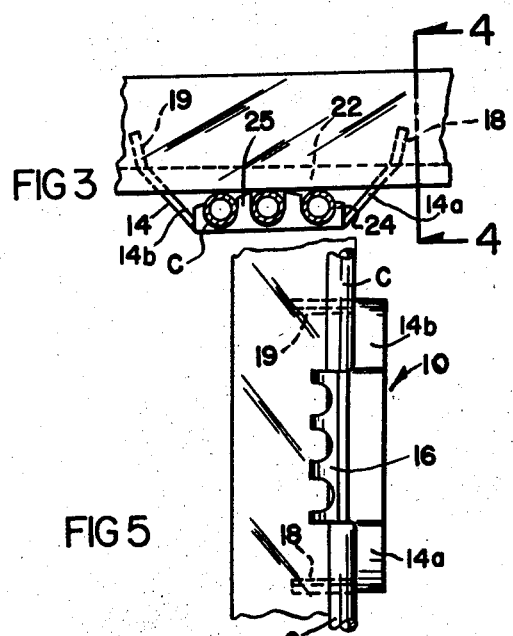
FIG 3
FIG 5
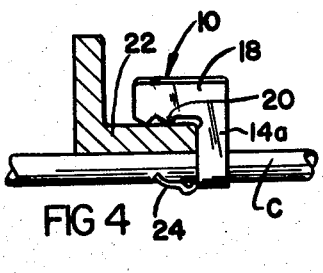
FIG 4
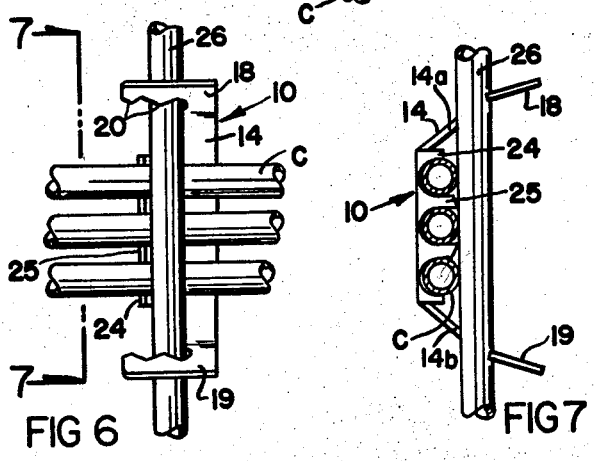
FIG 6  FIG 7
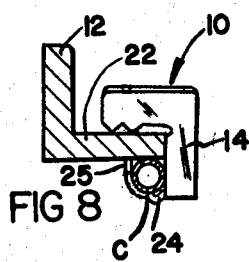
FIG 8
INVENTOR.
LESLIE N. HAVENER
BY Oberlin, Maky & Donnelly
ATTORNEYS

United States Patent Office

3,180,597
Patented Apr. 27, 1965

3,180,597
CLIP TYPE FASTENER
Leslie N. Havener, Euclid, Ohio, assignor to Erico Products, Inc., Cleveland, Ohio, a corporation of Ohio
Filed Oct. 15, 1962, Ser. No. 230,550
10 Claims. (Cl. 248—68)

This invention relates as indicated to clip type fasteners and more particularly to a fastener adapted to support elongated articles on supporting beams, struts and the like.

There are many instances in modern building construction where it is necessary to secure or suspend elongated articles from an appropriate support at spaced intervals along the support. An example is in the construction of suspended ceilings where the suspended structure supports, for example, expanded metal lath to be plastered. Likewise, electrical and other conduits must frequently be attached to or suspended from supporting structures such as channels, rods, I-beams and angle members. It is therefore important that the fastening means employed be relatively inexpensive, quickly and easily installed, and highly effective in usage, and it is accordingly a principal object of this invention to provide such a fastening means in the form of a clip type fastener.

A further object of this invention is to provide a clip type fastener which is capable of attaching or suspending an elongated article to a supporting member whether the article to be supported extends parallel or transverse to such supporting member.

A further object is to provide a clip type fastener of such type which may be manually installed without requiring the use of special tools and which may be subsequently removed quickly and without damage to the article being supported or to the fastener, whereby the latter is immediately reusable.

Yet another object of the invention is to provide a clip type fastener that resiliently firmly engages the supported article and the supporting member continuously to hold the article in place without shifting or rattling.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a fragmentary perspective view showing a fastener embodying the principles of the invention suspending a plurality of conduits extending transversely to the fastener from a channel member;

FIG. 2 is a bottom plan view of the FIG. 1 assembly;

FIG. 3 is an elevational view, partly in section, taken on line 3—3 of FIG. 2, with the assembly being inverted from the FIG. 2 showing to show the conduits held in suspended position relative to the supporting angle member;

FIG. 4 is an end view, partly in section, taken on line 4—4 of FIG. 3;

FIG. 5 is a bottom plan view similar to FIG. 2 showing, however, a single conduit suspended from the supporting angle member and extending longitudinally relative to the fastener;

FIG. 6 is a top plan view illustrating the manner of employing such fastener to suspend a conduit extending transversely to the fastener from a rod member;

FIG. 7 is an elevational view, partly in section, taken on line 7—7 of FIG. 6; and FIG. 8 is a view similar to FIG. 4 showing, however, the elongated article extending longitudinally relative to the fastener.

Referring now to the drawings, and especially to FIGS. 1–4 thereof, there is shown therein the fastener of the invention, generally indicated at 10, employed firmly to support a plurality of conduits C extending transversely to the longitudinal axis of the fastener on a channel member 12. The fastener 10 is preferably formed from an elongated resilient spring steel strip and comprises a longitudinally extending body portion 14 which comprises a flat central portion and arms 14a and 14b extending obliquely from the respective ends thereof, the entire body portion being of generally uniform width, an integral, centrally disposed rib portion 16 extending outwardly from the central portion of the body portion 14 so as to be laterally offset therefrom, and a pair of integral tab members 18 and 19 disposed at the outer ends of the arms 14a and 14b, respectively, and extending in the same direction as rib 16. The tabs 18 and 19 are provided with preferably beveled detents 20 and 21, respectively, which resiliently firmly engage the flange 22 of the channel 12 thus to provide a stable two point contact with the flange to prevent rocking of the fastener when in firm engagement with the flange.

The rib portion 16 is convexly rounded adjacent the forward edge thereof whereby such forward edge is offset from the plane of the main part of the rib 16 and the central portion of the body portion 14. The forward edge is provided in the form shown with a pair of relatively short prongs 24 disposed at either end of the rib 16 and a plurality of intermediate, relatively longer prongs 25, the prongs 24 and 25 being spaced to form therebetween a plurality of aligned openings for receiving transversely extending conduits as shown. The relatively longer prongs 25 are of sufficient length to firmly resiliently contact the flange 22 to provide a firm point contact therewith to prevent rocking of the fastener in a longitudinal direction. The prongs 25 which contact the flange 22 are preferably beveled to provide point contacts with the flange to further enhance gripping thereto. It will thus be seen that in addition to providing increased rigidity to the fastener 10 in the central portion thereof the rib 16 functions firmly to engage the supporting flange and to space the transversely extending supported conduits C by means of the aligned openings formed between the prongs.

In the application of the fastener in the FIGS. 1–4 environment the transversely extending conduits C are first positioned in the openings between the prongs 24 and 25. The tabs 18 and 19 are then grasped by the operator and moved toward each other, such movement being possible of course due to the resiliency of the spring steel, the arms 14a and 14b are resiliently bent whereby the prongs 24 and 25 are substantially vertically offset from the detents 20. The fastener is then positioned on the flange 22 with the tabs 18 and 19 disposed above the flange 22 and the conduits C and prongs 24 and 25 disposed therebelow, the fastener 10 being moved inwardly on the flange until the arms 14a and 14b contact the vertical side wall of the flange 22. The tabs 18 and 19 are then released whereby the resiliency of the spring steel forces the same outwardly away from each other whereby the detents 20 and 21 firmly contact the upper surface of the flange 22. Likewise, the resiliency of the spring steel causes the prongs 25 to firmly engage the bottom surface of the flange 22 thereby firmly attaching the conduits C to the channel 12.

It is significant that the line of contact of the prongs 25 with the bottom surface of the flange 22 is generally coincidental with the line extending between the valleys between the detents 20 and between the detents 21, as shown in FIG. 4, for example. This general alignment of contact points prevents the fastener from moving either longitudinally or transversely on the flange as well as providing maximum effective holding power for the fastener.

As noted above, the novel clip fastener of the invention is also capable of supporting elongated articles extending parallel to the longitudinal axis of the fastener, and such an arrangement is shown in FIGS. 5 and 8. As shown most clearly in FIG. 8, the conduit C is disposed in the opening formed between the convexly rounded outer edge of rib 16 and the supporting flange surface. When it is desired to support a conduit C extending parallel to the fastener, a fastener is preferably selected of sufficient size to enable the prongs 25 to similarly contact the bottom surface of the flange to accomplish the advantages explained above attending such contact.

The application of the fastener wherein the conduit C is disposed in the FIGS. 5 and 8 direction is generally similar to that explained above with reference to FIGS. 1 through 4; the tabs 18 and 19 are grasped and resiliently bent. The conduit C is then disposed or cradled in the outer curved edge of the rib 16 and held thereon by virtue of such curvature. The fastener is then moved forwardly in the above-described manner with the tabs 18 and 19 and the beveled edges of prongs 25 contacting the flange 22 as previously described. Subsequent release of the tabs 18 and 19 results in the firm resilient engagement of the detents 20 and 21 and prongs 25 with the upper and lower surfaces, respectively, of the flange 22. As above described, the lines of force applied by detents 20 and 21 and prongs 25 due to the resiliency of the spring steel act through a generally straight line extending between the valleys between the detents 20 and between the detents 21 and the pointed edges of the prongs 25 thereby firmly to support the conduit C thus preventing wobbling of the fastener on the flange 22.

As shown in FIGS. 6 and 7, the novel clip fastener of the invention can also be employed to suspend conduits or the like from a rod supporting member indicated at 26. In positioning the fastener and the conduits carried thereby on the rod 26, the conduits C are disposed in the openings formed by the prongs 24 and 25 and the fastener is resiliently distorted by grasping the tabs 18 and 19, all as above described. The fastener 10 is then moved toward the rod 26 and the tabs 18 and 19 are disposed thereover, the rod 26 extending generally beneath the innermost tabs 20 and 21. The subsequent release of the tabs 18 will cause such innermost tabs 20 and 21 to firmly resiliently contact the rod 26 and the prongs 25 firmly resiliently to contact the conduits C thereby rigidly supporting the conduits C on the rod 26. The release of the fastener 10 is accomplished similarly to that described above.

It will thus be seen that there has been provided a novel clip type fastener which is inexpensive to manufacture and simple in construction, and capable of quick and easy installation without requiring the use of special tools. The fastener is capable of supporting elongated articles extending either transversely or parallel to the fastener. Further, the novel fastener is constructed to provide maximum effective holding power and functions to firmly support the articles on the supporting surface without rocking or wobbling.

Although there has been shown in certain of the figures three supported conduits it would be obvious that a differing number thereof could equally satisfactorily be supported in the same manner. It will also be obvious that the size of the fastener can be changed to accommodate various size conduits or similarly elongated articles to be supported by various shaped flanges or rod members.

Other modes of applying the principle of the invention may be employed, change being made as regards the details described, provided the features stated in any of the following claims or the equivalent of such be employed.

I, therefore, particularly point out and distinctly claim as my invention:

1. A clip type fastener for securing elongated articles to supporting members, comprising an elongated strip of spring steel having a longitudinally extending body portion which comprises a generally flat central portion and arms extending obliquely from the respective ends thereof, each of said arms forming with said central portion an included angle of greater than ninety degrees, said arms being obliquely inclined relative to said central portion to the same side thereof, a rib projecting laterally from one side edge of said central portion and terminating in a forward edge portion offset from the plane of said central portion in the same direction as said arms, and resilient tab members projecting laterally from the outer end of said respective arms to the same side as said rib for resiliently firmly contacting said supporting member.

2. A clip type fastener for securing elongated articles to supporting members, comprising an elongated strip of resilient material having a longitudinally extending body portion which comprises a generally flat central portion and arms extending obliquely from the respective ends thereof, each of said arms forming with said central portion an included angle of greater than ninety degrees, said arms being obliquely inclined relative to said central portion to the same side thereof, a plurality of prongs extending from one side edge of said central portion and projecting to the same side thereof as said arms, said prongs being adapted to receive such elongated articles therebetween transversely of said fastener and supporting member, and resilient tab members projecting laterally from the outer ends of said respective arms for resiliently firmly contacting said supporting member.

3. The combination of claim 2 wherein at least certain of said prongs are adapted to contact the surface of such supporting member when said fastener is operatively secured thereto, with the leading edges of such prongs being beveled to provide point contacts with said supporting member.

4. A clip type fastener for securing elongated articles on supporting members comprising an elongated strip of spring steel having a longitudinally extending body portion which comprises a generally flat central portion and arms extending from the respective ends thereof to the same side thereof, a rib projecting laterally from one edge of said central portion and being convexly rounded and terminating in a forward edge portion offset from the plane of said central portion in the same direction as said arms, the forward edge of said rib comprising a plurality of spaced, longitudinally aligned prongs, adjacent prongs forming therebetween openings receiving elongated articles disposed transversely to said fastener and said supporting member, certain of said prongs firmly resiliently contacting the surface of said supporting member, tab members disposed at the outer ends of said respective arms, said tab members extending laterally therefrom in the same direction as said rib, each of said tab members being provided with a pair of spaced detents having pointed forward ends to provide point contact between said detents and said supporting member.

5. The combination of claim 4 wherein the forward edge of said rib is aligned with the approximate midpoints between said pointed detents on said tabs.

6. A clip type fastener for securing elongated articles to supporting members, comprising an elongated strip of spring steel having a longitudinally extending body portion which comprises a generally flat central portion and arms extending obliquely from the respective ends thereof, each of said arms forming with said central portion an included angle of greater than ninety degrees, said arms being obliquely inclined relative to said central portion to the same side thereof, a rib projecting laterally from one side edge of said central portion, said rib being convexly rounded for receiving elongated articles disposed longitudinally to said fastener and terminating in a forward edge portion offset from the plane of said central portion in the same direction as said arms, and resilient tab members projecting laterally from the outer ends of said respective arms to the same side as said rib for resiliently firmly contacting said supporting member.

7. The combination of claim 6 wherein said forward edge of said rib comprises a plurality of spaced, longitudinally alingned prongs, adjacent prongs forming therebetween openings adapted to receive elongated articles disposed transversely to said fastener on said supporting member.

8. A clip type fastener for securing elongated articles such as electrical conduit and the like to a flange portion of a supporting member, comprising an elongated strip of thin flat resilient sheet material formed into general flaring U-shape transversely of the plane of such strip, tabs extending laterally from the respective end portions of said strip in the same direction for engagement with the same side of such supporting flange, and a pair of generally parallel upstanding prongs projecting upwardly within the confines of the U-shape profile of said fastener to engage the other side of such supporting flange and receive such conduit or like element to be supported thereby.

9. The fastener of claim 8, wherein said prongs project thus upwardly from a laterally offset central portion of said strip with such prongs accordingly being in general alignment with said tabs longitudinally of the fastener.

10. The fastener of claim 9, wherein said tabs are provided with inwardly oppositely directed detent means adapted to engage the same surface of such flange in general alignment longitudinally of said fastener with the ends of said prongs engaging the other side of such flange.

References Cited by the Examiner
UNITED STATES PATENTS

| 564,272 | 7/96 | Cooper | 248—216 |
| 2,371,210 | 3/45 | Atkinson | 248—216 X |
| 2,855,648 | 10/58 | Jansson | 248—68 X |

CLAUDE A. LE ROY, *Primary Examiner.*